(12) United States Patent
Rudoy et al.

(10) Patent No.: US 8,904,889 B2
(45) Date of Patent: Dec. 9, 2014

(54) HIGH LOAD RELEASE DEVICE

(75) Inventors: Edward Rudoy, Woodland Hills, CA (US); Larry Leroy McCormick, Chatsworth, CA (US); Edwin Vega, Woodland Hills, CA (US); Nury Izrailov, Valley Glen, CA (US)

(73) Assignee: NEA Electronics, Inc., Chatsworth, CA (US)

( * ) Notice: Subject to any disclaimer, the term of this patent is extended or adjusted under 35 U.S.C. 154(b) by 1547 days.

(21) Appl. No.: 11/193,451

(22) Filed: Aug. 1, 2005
(Under 37 CFR 1.47)

(65) Prior Publication Data

US 2010/0089189 A1  Apr. 15, 2010

Related U.S. Application Data

(60) Provisional application No. 60/592,395, filed on Aug. 2, 2004.

(51) Int. Cl.
*G05G 17/00* (2006.01)
*B64G 1/22* (2006.01)

(52) U.S. Cl.
CPC ............... *B64G 1/222* (2013.01); *G05G 17/00* (2013.01)
USPC ...................... 74/2; 361/160; 337/401; 403/2

(58) Field of Classification Search
USPC ......... 74/2; 87/8; 294/74; 248/74.3; 403/310, 403/314, 328, 329; 279/110; 337/4, 142, 337/401; 24/17 A, 19, 20 R, 27, 273
See application file for complete search history.

(56) References Cited

U.S. PATENT DOCUMENTS

| | | | | | |
|---|---|---|---|---|---|
| 290,351 | A | * | 12/1883 | Parry | 24/273 |
| 2,059,825 | A | * | 11/1936 | Talbott | 248/61 |
| 2,480,755 | A | * | 8/1949 | McElroy | 24/269 |
| 5,282,709 | A | * | 2/1994 | Chaput et al. | 411/433 |
| 5,716,157 | A | * | 2/1998 | Kester et al. | 403/291 |
| 5,722,709 | A | * | 3/1998 | Lortz et al. | 294/86.4 |
| 6,249,063 | B1 | | 6/2001 | Rudoy et al. | |
| 6,269,748 | B1 | | 8/2001 | Rudoy et al. | |
| 6,433,990 | B1 | | 8/2002 | Rudoy et al. | |
| 6,525,920 | B2 | | 2/2003 | Rudoy et al. | |
| 8,021,069 | B2 | * | 9/2011 | Baghdasarian | 403/2 |
| 8,568,053 | B2 | * | 10/2013 | Baghdasarian | 403/2 |

* cited by examiner

*Primary Examiner* — William C Joyce
(74) *Attorney, Agent, or Firm* — Cantor Colburn LLP

(57) ABSTRACT

The restraining strap has a rectangular cross section with a broad side against cylindrical sections holding a release member. The moment of inertia for a rectangular cross section strap is represented by the formula I=BH3/12. The lower moment of inertia reduces the load on the fusible link. With no limit to the number of wraps around the cylindrical sections, higher preloads can be accommodated by increasing the number of wraps of the restraining strap without affecting the moment of inertia or the amount of force borne by the fusible link. The actuator has a catch extending between the restrainer and actuator. The catch ends engage the restrainer and actuator and, upon release from the actuator, the catch rotates to allow the restrainer to unwind from about the cylindrical sections.

9 Claims, 8 Drawing Sheets

HIGH LOAD RELEASE DEVICE

This application claims the benefit of provisional application 60/592,395, filed Aug. 2, 2004.

BACKGROUND OF THE INVENTION

Previous release devices include cylindrical sections retained together by a restraining wire wrapped about the sections to form a cylinder. The interior of the cylinder is formed with a conical recess. The recess restrains a spherical or conical rod end. Attached to and depending from this spherical rod end is a shaft. The force applied to the release member is borne by the cylindrical sections. The terminal end of the wire is connected to a fusible link. Upon the application of an electrical current, the fusible link heats and breaks. With release of the fusible link, the restraining wire unravels about the cylinder allowing the cylindrical sections to separate. Separation of the cylindrical sections allows movement of the release member.

One embodiment of a release device is disclosed in U.S. Pat. No. 6,525,920 (Rudoy et al.). Cylindrical sections 16, 18 are surrounded by retaining wire 28 wound multiple times about the cylindrical sections to keep them in close contact. Release pin 76 having a spherical head portion 86 and depending shaft portion 84 is retained within the recess 70 formed by the two cylindrical sections. When fusible links 42a, 42b, attached to a power supply or decoupling device 50 fail, the restraining wire unravels allowing the two cylindrical sections to separate and release the release pin 76, as seen in FIG. 2.

A similar device is disclosed in U.S. Pat. No. 6,269,748, having cylindrical sections 52, 54, retained together by restraining wire 55. A plunger shaft 48 bears against cone shaped opening 56 formed by the cylindrical section. Upon failure of a fusible link, the restraining wire no longer keeps cylindrical sections together, allowing the plunger shaft 48 to extend between the cylindrical sections under the action of spring 76 as seen in FIGS. 2 and 3.

It is an object of the invention to provide a restraining device having cylindrical sections retaining a release device against movement under high loads.

It is another object of the invention to provide a release mechanism having two cylindrical sections kept together by a restraining strap.

It is yet another object of the invention to provide a restrainer connected to an actuator by a catch.

It is still another object of the invention to use a restrainer having a broad side bearing against cylindrical sections to retain the sections together.

These and other objects of the invention will become apparent to one of ordinary skill in the art after reading the disclosure of the invention.

SUMMARY OF THE INVENTION

Previous embodiments of release devices having cylindrical sections utilize retaining wire to retain the sections together but separating upon release of a fusible link. The restraining wire wrapped multiple times around the cylindrical sections has a circular cross section. Multiple windings dissipate the radial outward force of the cylindrical sections resulting in the principal force bearing against the fusible link to be the force at the end of the retaining wire. The preload of the restrained rod end determines the diameter of the restraining wire necessary to withstand the force applied against the cylindrical sections. With increasing preloads, the diameter of the restraining wire increases. The moment of inertia of a wire having a cylindrical cross section increases with the diameter of the wire and is represented by the formula $I=D^4/64$. Also with increasing preloads, the load borne by the fuse wire increases.

In an effort to reduce the load of the fuse wire resulting from ever increasing preload requirements, a restraining strap or belt replaces the restraining wire. The restraining strap has a rectangular cross section with a broad side against the cylindrical sections. The moment of inertia for a rectangular cross section strap is represented by the formula $I=BH^3/12$. The lower moment of inertia reduces the load on the fusible link. With no limit to the number of wraps around the cylindrical sections, higher preloads can be accommodated by increasing the number of wraps of the restraining strap without affecting the moment of inertia or the amount of force borne by the fusible link.

The actuator has a catch extending between the restrainer and actuator. The catch ends engage the restrainer and actuator and, upon release from the actuator, the catch rotates to allow the restrainer to unwind from about the cylindrical sections.

DETAILED DESCRIPTION OF THE INVENTION

Figure 1:
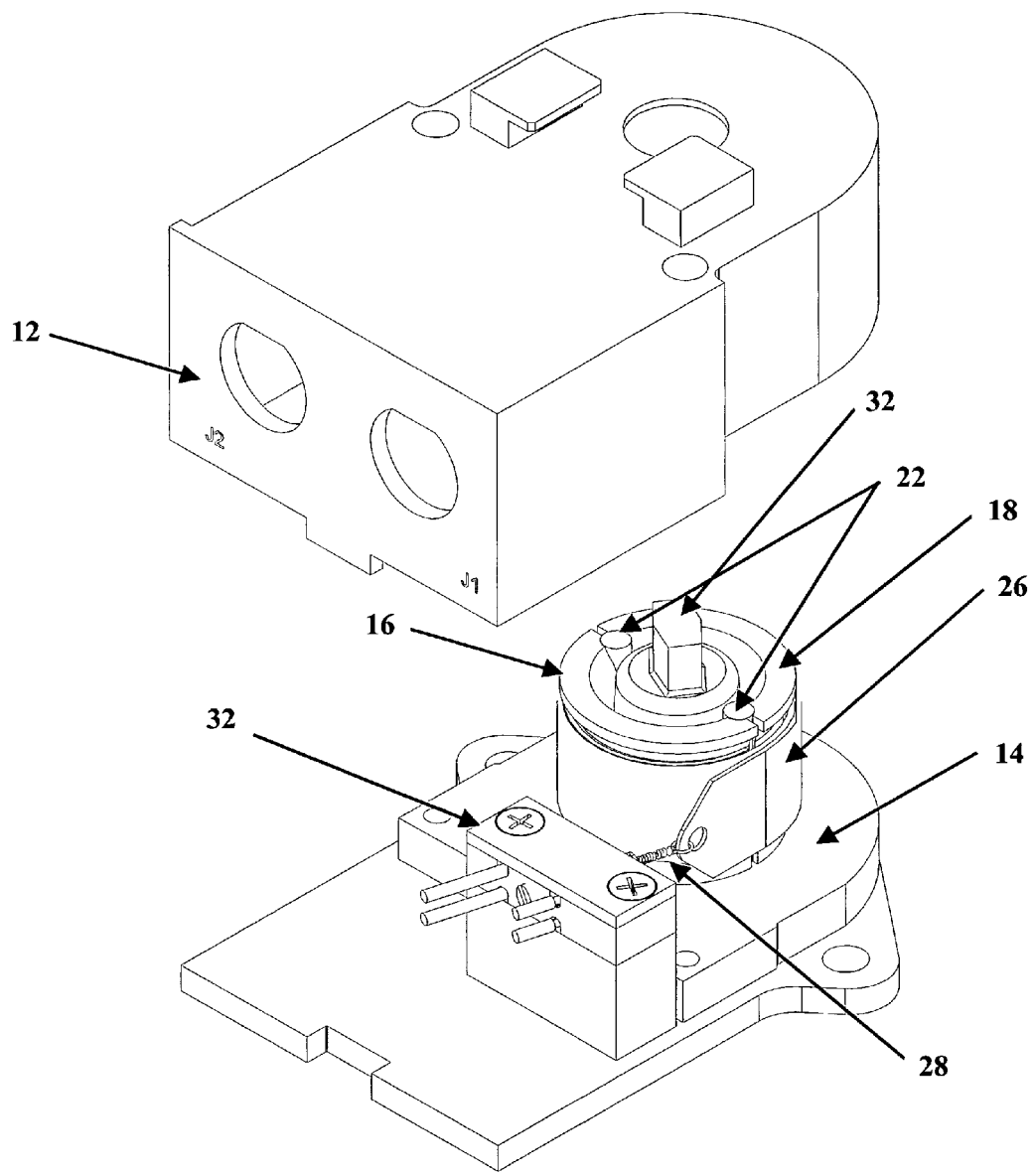
FIG. 1 is an exploded perspective view of the release device in the restraining position.

The release device 10 has a base 14 covered by a housing 12. On the base two cylindrical sections 16, 18 are held in close relation by a restrainer, such as restraining strap 26. The restraining strap is made of resilient material, such as steel, and resembles a clock spring. The broad side of the strap bears against the cylindrical sections to maintain them in contact. A first end of the strap is connected to one of the cylindrical sections with the other end of the half ending in a lanyard 28. The lanyard 28 connects to an actuator. The actuator includes a fusible link. The ends of the fusible link are connected to terminals on the terminal block 32. The terminal block 32 provides electrical current to heat the fusible link. Upon heating, the fusible link releases from the terminal block, allowing the restraining strap to unravel about the cylindrical sections.

Posts 22 are permanently connected and extend upwardly from the base 14. The posts sit within grooves formed on the inner surface of the cylindrical sections interior. The posts prevent rotation of the cylindrical sections 16, 18 as the restrainer is wound about the cylindrical sections, as disclosed in U.S. Pat. No. 6,525,920, herein incorporated by reference.

When the sections are held together, a recess formed in the cylinder retains a head 32 of a release member. A load is applied to the release member and is released with the unraveling of the restraining strap 26, as will be described later.

Figure 2:
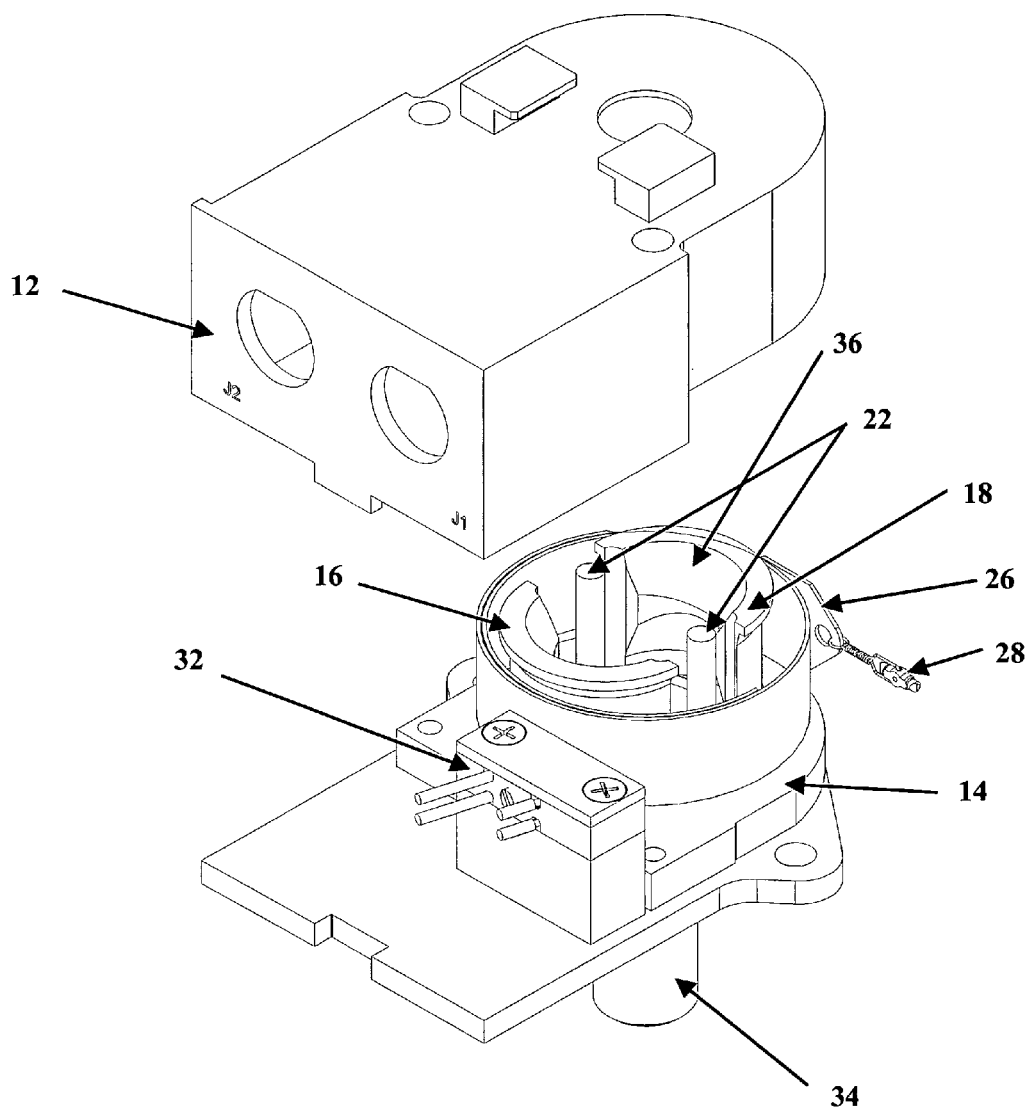
FIG. 2 is a perspective view of the restraining device in the release position.

FIG. 2 shows the configuration of the release device after release of the fusible link. The restraining strap 26 has unraveled and assumed a larger diameter, allowing the cylindrical sections to move away from each other under the force applied by the release member. The release member is able to move downwardly through the base. In the view, the shaft 34 of the release member is seen as it exits through the bottom of the base 14. The conical, hemispherical or hemispherical recess 36 can also be seen when the sections are separated.

Figure 3:
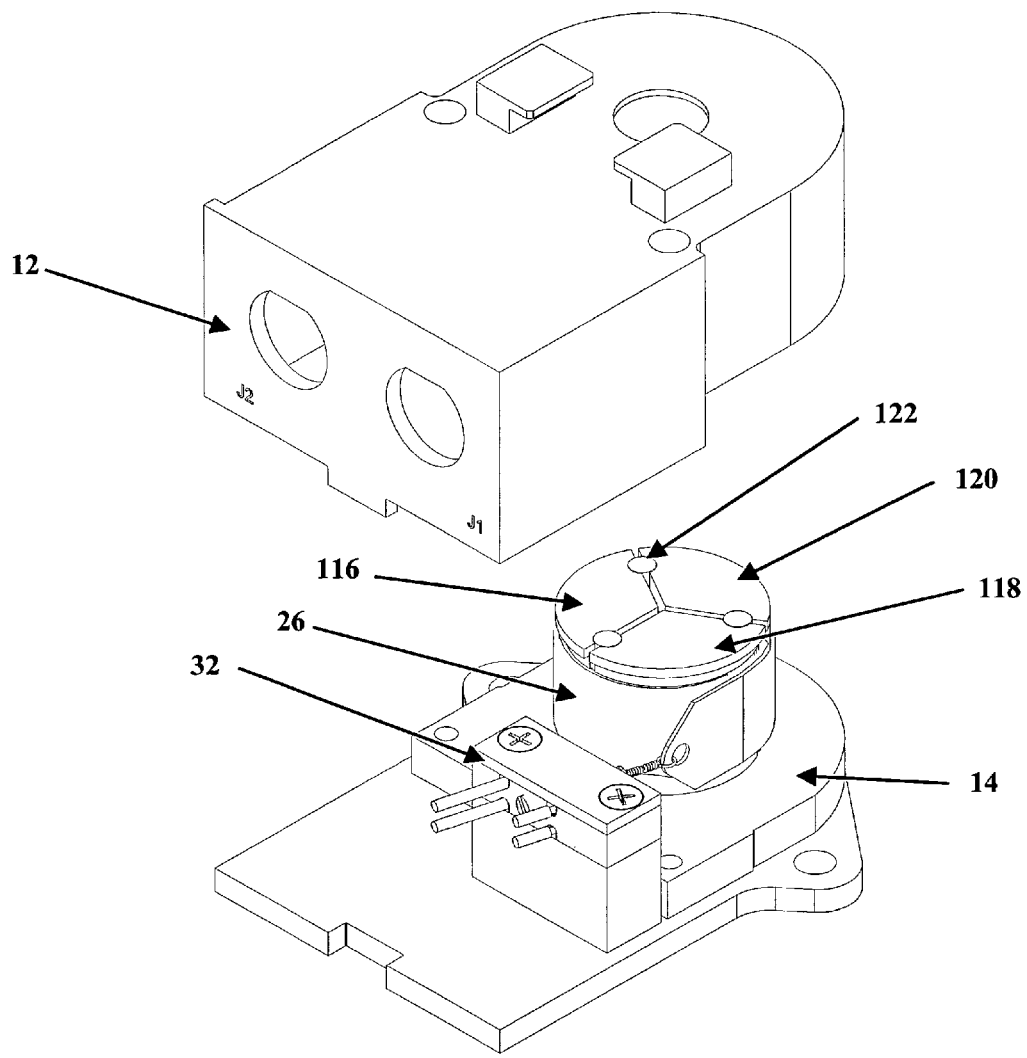
FIG. 3 is an exploded perspective view of the embodiment having a three part cylinder in the restraining position.

FIG. 3 shows an alternative embodiment of the release device with the same reference numerals used to designate identical structure. In this instance, the base 14 supports three posts 122. Three posts are needed as the cylinder is split into three sections 116, 118, 120. The posts serve the same function in preventing rotation of the cylinder with winding of the restraining strap 26. The release device has a flange fitting within the groove. The release device is put into the proper position and the cylindrical sections are then brought into place and maintained in position by a restrainer, such as a restraining strap.

Figure 4:
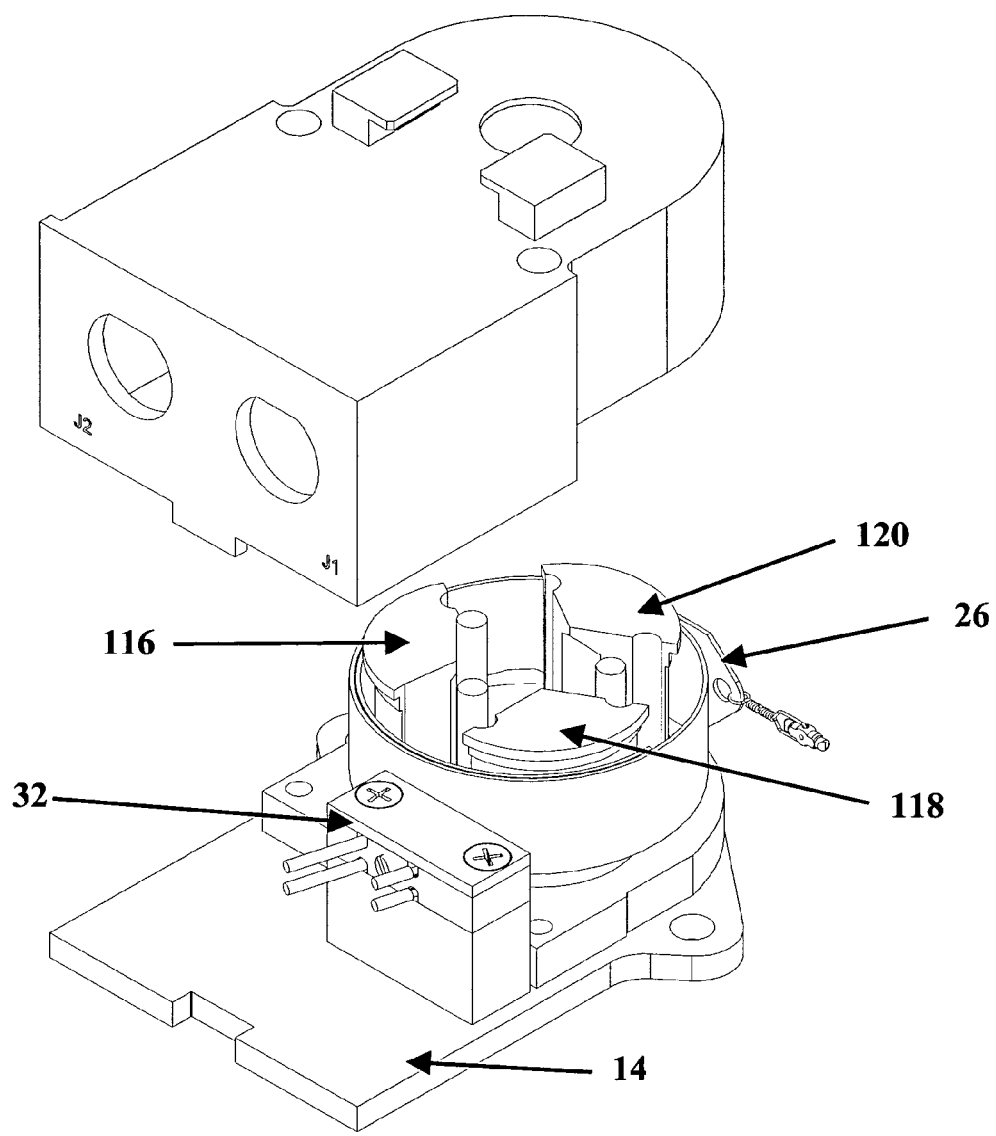
FIG. 4 is an exploded perspective view of the three part cylinder in the release position.

FIG. 4 shows the release device after release of the fusible link and release of the restraining strap. The cylindrical sections 116, 118, 120 move radially outwardly away from one another allowing release of a release member. The release member is held within the cylinder by the inner surface of the cylinder and outer surface of the release member having mating connecting surfaces. In one embodiment, the inner surface of the cylinder and outer surface of the release member having mating threaded surfaces. After the cylinder is wrapped with the restraining strap, the release member can be screwed in place. Alternatively, the release member may have one or more flanges that mate with circumferential grooves in the inner surface of the cylinder. In this instance, the release member is put into position and the cylindrical sections brought together about the release member to hold the flange within the groove.

Figure 5:
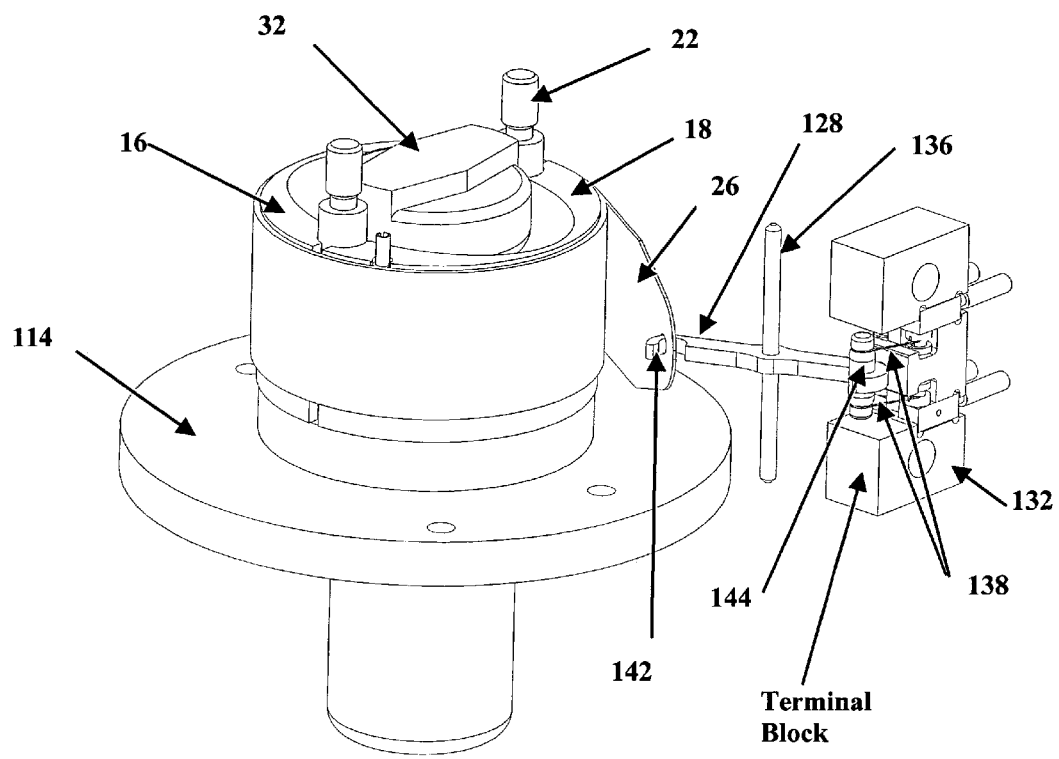
FIG. 5 is an isometric view of the release device having an alternative release mechanism in the restraining position.
Figure 6:
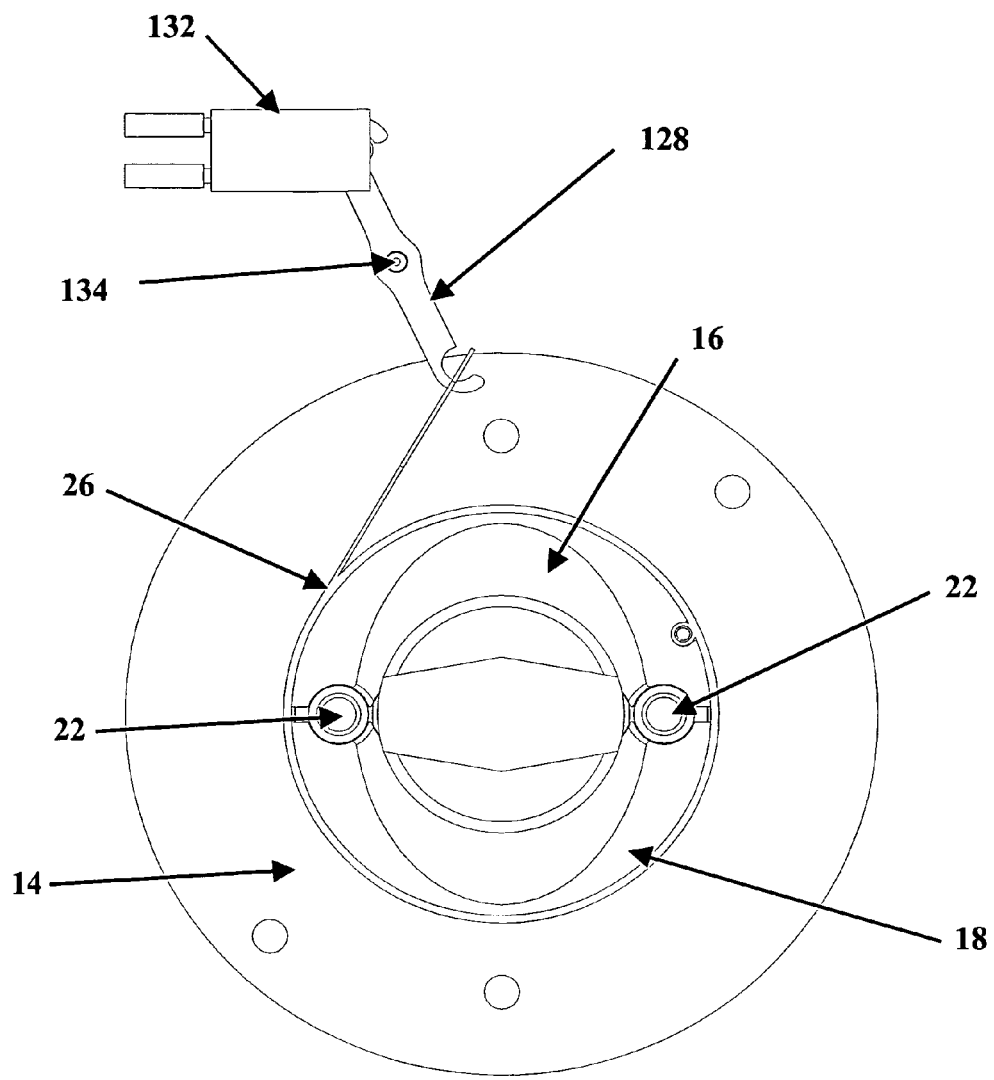
FIG. 6 is a top view of the release device of FIG. 5.

An alternative actuator for the release device is seen in FIG. 5. The base 114 accommodates the cylindrical section 16, 18 and the head 32 of the released member. A restrainer 26, such as a restraining strap or restraining wire, surrounds the cylindrical section. The actuator includes a vertically oriented terminal block 132 with a rod 137 extending across a gap in the terminal block. The rod is held by a pair of fusible links 138. The use of a pair of fusible links adds a redundant feature to the device as only one has to break to release the rod 137. A catch 128 has hooked ends 142, 144. The first hooked end 142 engages an aperture in the end of restraining strap 26. The second hooked end 144 engages the rod 137. The catch 128 has central rod 136 extending vertically therefrom. In this arrangement, the restraining strap 26 is held in position and is seen in the top view of FIG. 6.

Figure 7:
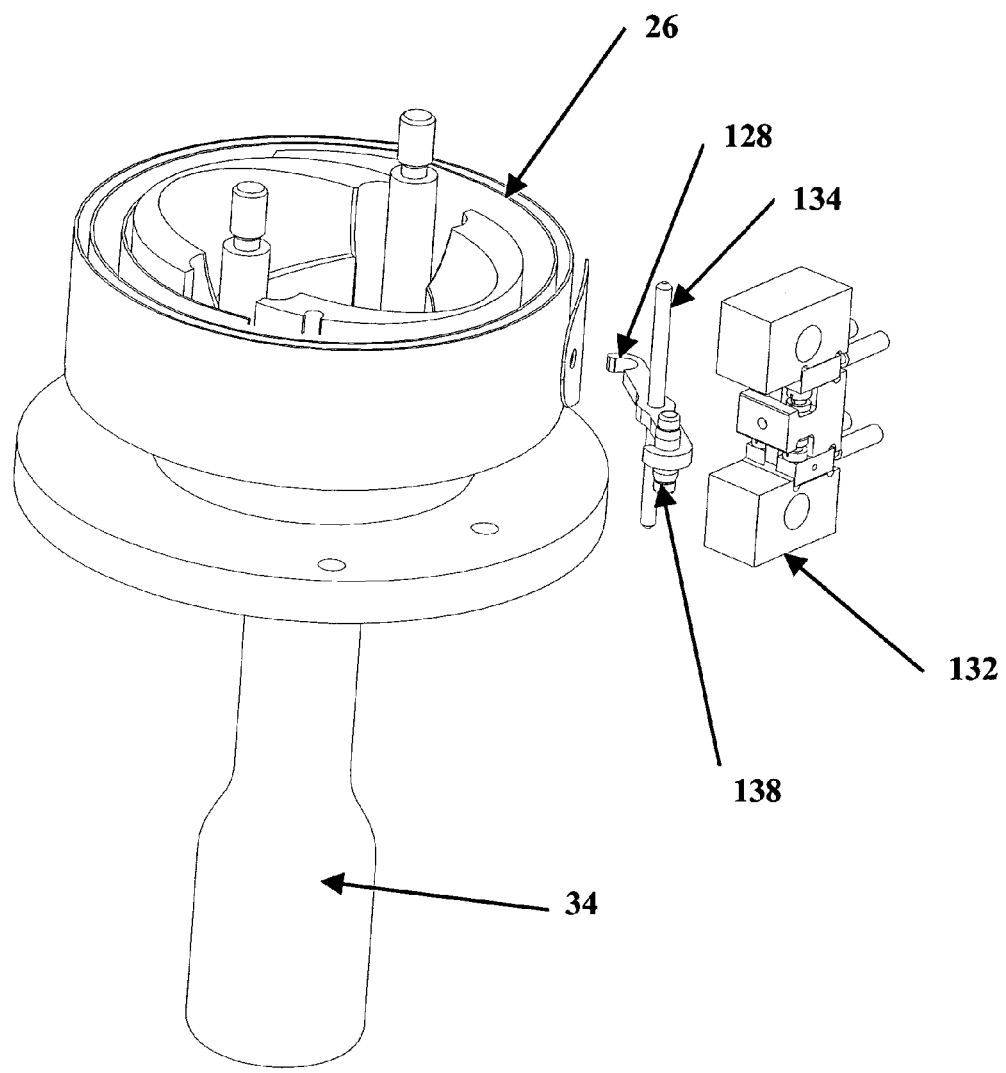
FIG. 7 is the device of FIG. 5 in the released position.
Figure 8:
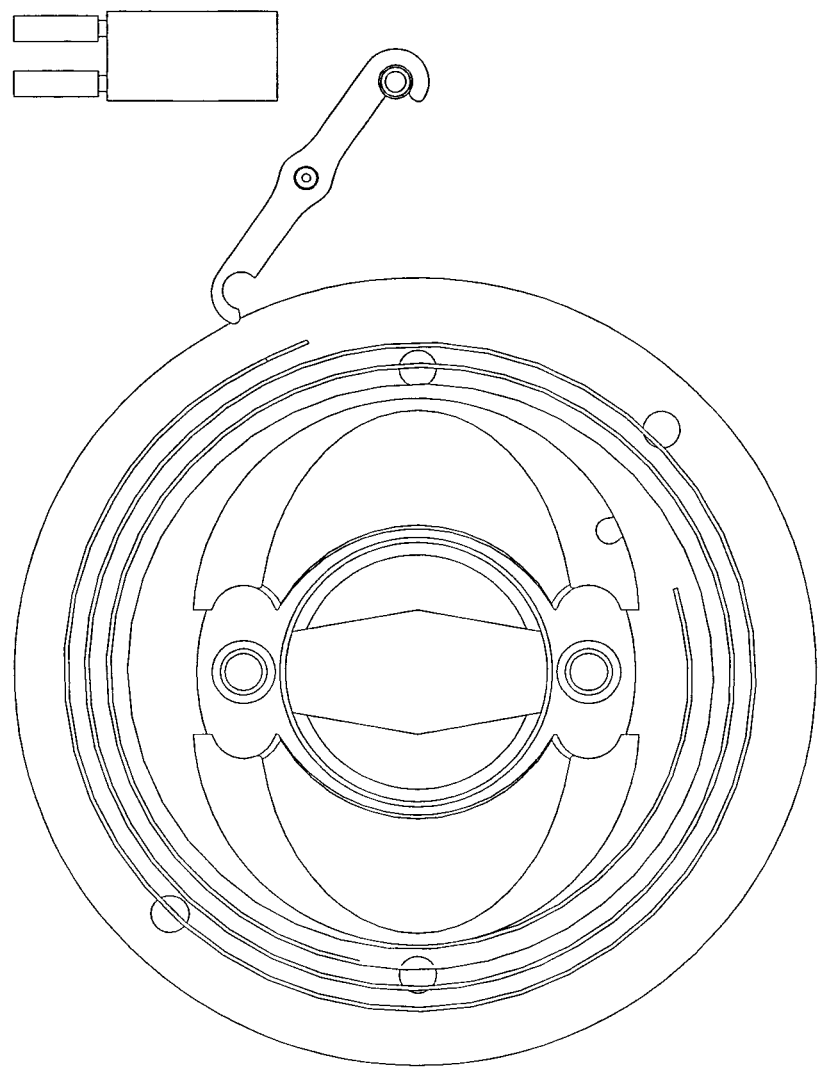
FIG. 8 is a top view of the released position shown in FIG. 7.

FIG. 7 shows the released condition of the release device seen in FIG. 5. In this condition, the fusible link 138 has released the rod 137 from terminal block 132. The resilience of the restraining strap 26 causes it to unwind and, in so doing, causes clockwise rotation of the catch 128. With the rotation of the catch 128, the hook end 142 becomes disengaged from the aperture in the restraining strap 26 allowing the continuing unraveling of the restraining strap 26 from about the cylindrical section 16, 18. The release member 34 is then no longer restrained. The released condition is seen in the top view of FIG. 8.

While the invention has been disclosed with reference to preferred embodiments, variations and modifications would be apparent to one of ordinary skill in the art. The invention encompasses such variations and modifications.

What is claimed is:

1. A release device comprising:

a base, cylindrical sections on the base, the cylindrical sections including at least a movable first cylindrical section and an opposing movable second cylindrical section, a release member retained by an inner surface of the cylindrical sections, a solid unitary restraining strap contiguously encircling the cylindrical sections by more than 360 degrees, wherein a first portion of the restraining strap overlaps a second portion of the restraining strap in a radial direction, the restraining strap having two ends, wherein the restraining strap is movable from a first diameter in contact with the cylindrical sections to a second position separated from the cylindrical sections, the restraining strap encircling the cylindrical sections by more than 360 degrees in the second position, an actuator, a first end of the restraining strap releasably connected to the actuator, wherein the restraining strap unravels from the first position to the second position in response to the actuator releasing the first end, wherein the first cylindrical section and the second cylindrical section are configured in operation to separate in response to the restraining strap unravelling.

2. The release devices of claim 1, wherein said actuator comprises a terminal block, a fusible link connected to the terminal block, and a lanyard extending between the fusible link and the first end of the restraining strap.

3. The release device of claim 1, wherein the restraining strap has a rectangular cross section.

4. A release device comprising:

a base, cylindrical sections on the base, the cylindrical sections having an inner and outer surface, a release member retained by the cylindrical sections inner surface, said release member having an outer surface, a solid unitary restrainer strap contiguously encircling the cylindrical sections by more than 360 degrees, wherein a first portion of the restraining strap overlaps a second portion of the restraining strap in a radial direction, the restrainer strap having two ends, wherein the restrainer strap is movable from a first diameter in contact with the cylindrical sections outer surface to a second position separated from the cylindrical sections, the restrainer strap encircling the cylindrical sections by more than 360 degrees in the second position, an actuator, a first end of the restrainer strap releasably connected to the actuator, wherein the restrainer strap unravels from the first position to the second position in response to the actuator releasing the first end, wherein the cylindrical sections are configured in operation to separate in response to the restraining strap unravelling, and mating connectors fixedly coupled to the base and arranged on the inner surface of the cylindrical sections and outer surface of the release member, the mating connectors arranged to prevent rotation of the cylindrical sections when the restrainer strap is in the first position.

5. The release device of claim 4, wherein there are two cylindrical sections.

6. The release device of claim 4, wherein there are three cylindrical sections.

7. A release device comprising:

a base, cylindrical sections on the base, the cylindrical sections including at least a movable first cylindrical section and an opposing movable second cylindrical section, a release member retained by an inner surface of the cylindrical sections, a unitary restraining strap having a rectangular cross-section that contiguously encircles the cylindrical sections by more than 360 degrees, wherein a first portion of the restraining strap overlaps a second portion of the restraining strap in a radial direction, the restraining strap having two ends, the restraining strap having a thickness and a width, the width being larger than the thickness, wherein the width is positioned against the cylindrical sections an actuator, a first end of the restraining strap releasably connected to the actuator, wherein the restraining strap unravels from a first position to a second position in response to the actuator releasing the first end, wherein the first cylindrical section and the second cylindrical section are configured in operation to separate in response to the restraining strap unravelling.

8. The release device of claim 7, wherein said actuator comprises a terminal block, a fusible link is connected to the terminal block, and a lanyard extends between the fusible link and the first end of the restraining strap.

9. The release device of claim 8 wherein the strap is sized and shaped to maintain a constant force on the fusible link.

* * * * *